United States Patent [19]
Nickerson

[11] 3,711,132
[45] Jan. 16, 1973

[54] METAL TUBE END FITTING
[75] Inventor: Harvey R. Nickerson, Roseland, N.J.
[73] Assignee: Resistoflex Corporation, Roseland, N.J.
[22] Filed: June 17, 1970
[21] Appl. No.: 46,983

[52] U.S. Cl..............................285/382.4, 285/422
[51] Int. Cl...............................................F16l 13/14
[58] Field of Search........285/259, 382.5, 382.4, 144, 285/328, 256, 422, 382, 382.1, 382.2; 29/507, 521, 523

[56] References Cited

UNITED STATES PATENTS

| | | | |
|---|---|---|---|
| 3,524,661 | 8/1970 | Farnum | 285/259 X |
| 3,284,112 | 11/1966 | Mortin | 285/422 X |
| 2,429,076 | 9/1947 | Sery | 285/382.4 |
| 2,092,358 | 9/1937 | Robertson | 285/382.4 X |

FOREIGN PATENTS OR APPLICATIONS 680,620  1/1965  Italy ................................285/382.4

Primary Examiner—Dave W. Arola
Attorney—Ward, McElhannon, Brooks and Fitzpatrick

[57] ABSTRACT

The axially spaced circumferential grooves within the bore of an end fitting to which a metal tube is attached by radial expansion are provided with a special contour. The group of grooves nearest the exterior of the fitting is provided with inclined sidewalls, while the inner adjacent group is provided with perpendicular sidewalls. In the process of assembly, the perpendicular sidewall grooves are substantially filled by the metal of the tubing while the inclined sidewall grooves are only partially filled.

15 Claims, 4 Drawing Figures

PATENTED JAN 16 1973 3,711,132

INVENTOR.
HARVEY R. NICKERSON
BY
Ward McClennon Brooks & Fitzpatrick
ATTORNEYS

METAL TUBE END FITTING

The present invention relates to a fitting for attachment to an end of a thin walled metal tube. More particularly, it relates to that type of fitting which is attached to the tube by expanding the tube within its interior.

In order to convert metal tubing into fluid conduiting, it is generally necessary to provide the tubing with end fittings. Various methods have been employed in the past to accomplish this purpose. One approach is to provide the interior bore of the fitting with annular grooves into which the metal of the tubing is deformed through an expanding step. It should be readily recognized that grooves with perpendicular sidewalls, or dovetail shaped grooves, assuming that the metal of the tubing can be forced thereinto, will provide maximum retention of the tubing in the fitting against axial separation.

For the purpose of securing soft metal tubes or even tubes of standard austenitic stainless steel to a fitting, it has been found satisfactory to employ a plurality of axially spaced grooves with perpendicular sidewalls. Recently, however, more and more use has been made of tubing made of titanium or a titanium alloy and it has been found that the maximum capabilities of the metal cannot be enjoyed when fittings of known construction are used with such tubes. Titanium alloy lines are being used extensively in aircraft and in space vehicles. In such use they are subjected to vibration and generally have been found to rupture or fail at the point where the tubing enters the fitting. Flexure tests of the tubing by itself have shown that the strength of the tubing substantially exceeds that demonstrated by assemblies with known end fittings. This decrease in performance has been traced to the design of the known fittings.

It is, therefore, an object of the present invention to provide a new fitting for thin walled tubing which increases the performance rating of assemblies made therewith.

It is another object of the invention to provide such an improved fitting without increasing the size or weight over that of fittings as heretofore known.

In accordance with the invention, a fitting is provided comprising a hard metal body portion having a bore which can be entered with a sliding fit from one end by the end of a metal tube, the bore having its sidewall formed with a plurality of axially spaced circumferential grooves, at least the groove nearest the one end of the bore having sidewalls which are inclined diverging radially inwardly with a substantial inclination, and at least one of the remaining grooves having substantially perpendicular sidewalls joining the radially inner surface of the bore with sharp edges.

The expression "perpendicular sidewall" as used herein is intended to define a surface which is perpendicular to the longitudinal axis of the fitting.

The invention will be better understood after reading the following detailed description of the presently preferred embodiment thereof with reference to the accompanying drawings in which.

The same reference numerals are used throughout the drawings to designate the same or similar parts.

Figure 1:
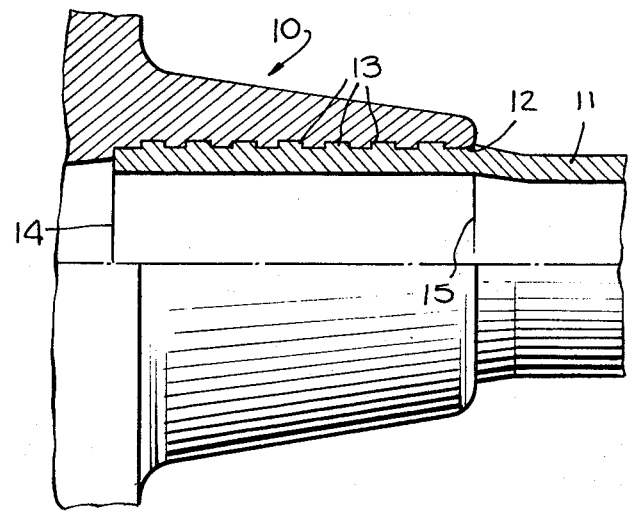
FIG. 1 is an elevational view in quarter section showing a fitting of known construction to which a thin walled tube of metal has been secured.

Referring now to FIG. 1, there is shown a fitting, designated generally by the numeral 10, of known configuration secured to a metal tube 11. The fitting is shown provided with a bore 12 in one end having its sidewall formed with a plurality, here seven, of axially spaced circumferential grooves 13. All of the grooves are shown with perpendicular sidewalls. The tubing 11 outside of the fitting is shown as having an external diameter which is designed to enter with a sliding fit the bore 12 of the fitting 10. However, in the process of assembly, the end of the tubing within the fitting is expanded radially within the region extending from its end 14 to an inner plane 15 so as to force metal into the grooves 13 of the fitting 10. A fitting as shown in FIG. 1 has proven satisfactory when employed with tubing of certain standard austenitic stainless steels such as types 304 and 321 stainless. However, when the fitting of FIG. 1 was applied to a titanium alloy tube it was found that the assembly failed far short of the inherent capability of the tubing itself.

In order to determine the capability of the tubing a strain gauge is secured to a small area on the external surface of the tube. The tube is then secured at one end in a fixture, and an arrangement for repeatedly deflecting the opposite end is adjusted until the amplitude of the deflection develops a stress at the strain gauge point equal to some desired limit. When this adjustment is completed the tube is repeatedly deflected through 10 million cycles or until fracture occurs, whichever occurs first. To determine the maximum capability of the tubing, the test is repeated at successively larger stress settings until fracture occurs. In this way the maximum stress to which the tubing can be subjected for 10 million cycles is ascertained. When testing with a fitting attached, the strain gauge is located at a point on the tube wall adjacent the end of the fitting.

For purpose of comparison, it is noted that a 1 inch diameter tube of a titanium alloy consisting essentially of three parts aluminum, 2½ parts vanadium, with the remainder titanium except for minor trace constituents, and having a wall thickness of approximately 0.058 inch has a flex failure rating of 40,000 psi at 10 million cycles. When such a titanium tube was assembled with a fitting of the type shown in FIG. 1, the maximum surface stress for flex failure was of the order of 15,000 to 20,000 psi. It should be apparent that this level is far below the maximum capability of the tubing per se.

Figure 2:
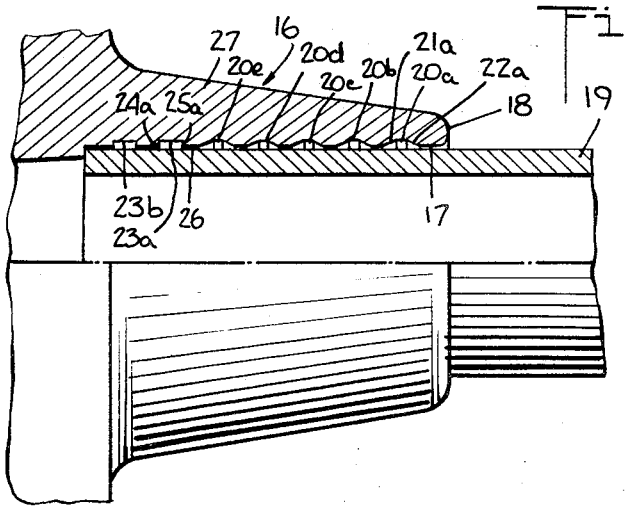
FIG. 2 is a view somewhat similar to that of FIG. 1 but showing a fitting modified in accordance with the present invention and to which the tubing has been only partially assembled.

With the foregoing in mind, it was discovered that the maximum stress level for flex failure could be substantially increased by modifying the interior configuration of the end fitting as shown in FIG. 2 to which attention is now directed. FIG. 2 shows the fitting with a tube inserted prior to expansion. The fitting is designated generally by the reference numeral 16. It has a bore 17 which can be entered with a sliding fit from the one end 18 by the end of the metal tube 19. The bore 17 has its sidewall formed with a plurality of axially spaced circumferential grooves of which at least the groove 20a nearest the one end 18 of the bore has sidewalls 21a and 22a which are inclined diverging radially inwardly with a substantial inclination. In a presently preferred embodiment of the fitting, the last mentioned inclination is approximately 14° 15' with respect to the longitudinal axis of the fitting. At least one of the remaining grooves such as the groove 23a has substantially perpendicular sidewalls 24a and 25a joining the radially inner surface 26 of the bore with sharp edges.

In the embodiment shown in FIG. 2 the grooves are divided into two groups. The first group is adjacent the one end 18 of the bore 17 and consists of grooves all identical with the groove 20a and, therefore, designated by the same basic reference numeral distinguished one from the other by the letters b, c, d and e appended thereto. Use of the basic reference numeral in the following discussion without an appended letter is to be understood as referring to the collective group wherein the number is used in common.

It will be observed that the series of grooves making up the first group provides the sidewall of the bore 17 with a surface approaching a smooth ripple. This may better be appreciated from the enlarged illustration in FIG. 4. The second group of grooves is adjacent the first group and consists of identical grooves 23a and 23b, having substantially perpendicular sidewalls.

The number of grooves with inclined sidewalls in the first group depends upon the size of the fitting. For the smaller sizes, it has been found satisfactory to employ only one such groove, namely, 20a, with the remaining grooves having the configuration of grooves 23. With larger diameter fittings it has been found preferable to have at least as many grooves in the first group as in the second group. In the following table there has been tabulated the total number of grooves, the number of grooves (having sloping sidewalls) in the first group, and the number of grooves (having perpendicular sidewalls) in the second group for various sizes of fittings which have been found satisfactory:

TABLE I

| Fitting Size | Total | Number of Grooves Group 1 | Group 2 |
|---|---|---|---|
| 3/16" | 4 | 1 | 3 |
| ¼" | 4 | 1 | 3 |
| 5/16" | 4 | 1 | 3 |
| ⅜" | 4 | 1 | 3 |
| ½" | 5 | 1 | 4 |
| ⅝" | 6 | 1 | 5 |
| ¾" | 6 | 3 | 3 |
| 1" | 7 | 5 | 2 |
| 1¼" | 8 | 5 | 3 |
| 1½" | 9 | 5 | 4 |

Still referring to FIG. 2, it will be observed that all of the grooves 20 in the first group are uniformly spaced axially from each other as well as from the one end of the bore 17. Furthermore, the bore 17 is radiused at the end 18 to provide an axial continuation of the smooth ripple surface referred to above. In addition, the body portion of the fitting 16 has a radially outer surface 27 concentric with the bore 17 and tapered throughout a zone at least substantially coextensive with the bore with the minimum diameter being over the one end 18 of the bore.

Figure 3:
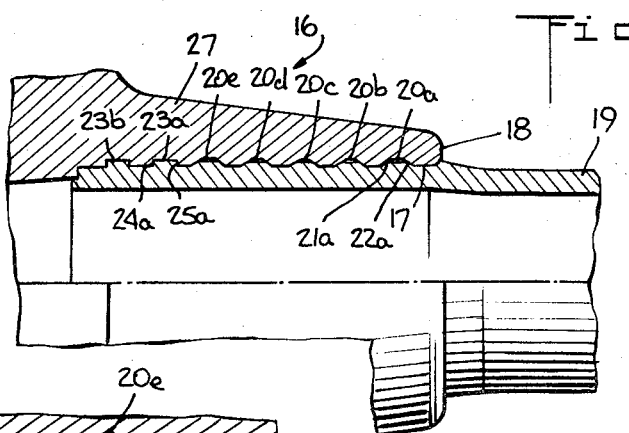
FIG. 3 is a sectional view showing the embodiment of FIG. 2 after the tubing has been expanded to complete the assembly.
Figure 4:
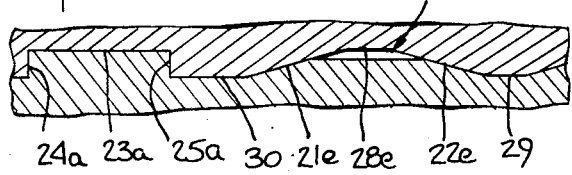
FIG. 4 is an enlarged fragmentary view showing a detail of the assembly of FIG. 3.

Now referring to FIGS. 3 and 4, it will be observed that upon radially expanding the tube 19 within the bore of the fitting 16 the metal of the tube flows into the grooves of the fitting with the grooves 23 being substantially filled and the grooves 20 being only partially filled. It is believed that this is due to the fact that the axial length of each of the land sections bordering the grooves 20 is substantially shorter than that bordering the grooves 23 resulting in lesser compression of the tubing in the region of the grooves of the first group than in the region of the grooves of the second group. The sharp edges at the margins of the grooves with the perpendicular sidewalls also contribute to the increased flow of tubing metal into the grooves 23.

It has been found that with a fitting of the type shown in FIGS. 2, 3 and 4 the maximum stress level with 1 inch titanium tubing of the type described above having a 0.058 inch wall is in excess of 30,000 psi. This represents an improvement of 10,000 to 15,000 psi.

Referring particularly to FIG. 4, it will be observed that the groove 20e has a short cylindrical surface 28e at its root and another short cylindrical surface 29 at its radially inner margin. These cylindrical surfaces which also characterize the other grooves 20 have been found useful for manufacturing purposes to provide reference surfaces for measurement. It is easier to control the diameter than if the two inclined walls 21 and 22 were caused to meet at a common plane. It will also be observed from FIG. 4 that in order to maintain the uniform axial spacing between the grooves of Groups 1 and 2 the land surface 30 is somewhat longer than the land surface 29.

As mentioned above, the inclination of the walls 21 and 22 is preferably slightly more than 14°. However, it has been found acceptable to permit the inclination of these walls to vary between approximately 9° and 23°. The objective, however, is to provide a smooth gradually rippled surface. The actual depth of the grooves that has been found satisfactory is of the order of 0.007 inch.

Both titanium and its alloys as well as steel have been used satisfactorily in fabricating fittings in accordance with the present invention.

No attempt has been made to show details of the remainder of the end fittings since it constitutes no part of the present invention and may take any desired form.

While the invention has been described as useful with a particular titanium alloy tube, it is not limited thereto. However, it is not possible to specify criteria for predicting in advance where the invention would be useful. The fitting embodying the invention has yielded improved results with: tubes of Armco 21-6-9 stainless steel, a new austenitic stainless steel; tubes of wrought aluminum alloy designated by The Aluminum Association as alloy 6061-T6; and with tubes of titanium alloy having the general formula 6Al + 4V + titanium and certain minor trace elements. In general, it is believed that the invention will yield improved results where the flex strength of assemblies employing prior art fittings falls far short of the flex strength of the tubing per se.

It will be understood by those skilled in the art that changes may be made in the specific details of construction without departing from the true spirit of the invention as defined in the appended claims.

What is claimed is:

1. A fitting wherein said grooves are divided into two groups, a first group being adjacent said one end of the bore and consisting of a plurality of grooves all of which have inclined sidewalls diverging radially inwardly with a substantial inclination such that the series of grooves making up said first group provide the sidewall of the bore with a surface approaching a smooth ripple, and a second group being adjacent said first group and consisting of a plurality of grooves all of which have sidewalls substantially perpendicular to the longitudinal axis of the fitting and joining the radially inner surface of said bore with sharp edges.

2. A fitting according to claim 1, wherein said first group consists of at least as many grooves as said second group.

3. A fitting according to claim 1, wherein all of the grooves in said first group are uniformly spaced axially from each other and from said one end of the bore, and said one end of the bore has its sidewall radiused to provide an axial continuation of said smooth ripple surface.

4. A fitting for attachment to an end of a thin walled metal tube, said fitting comprising a hard metal body portion having a bore which can be entered with a sliding fit from one end by the end of a metal tube, said bore having its sidewall formed with a plurality of axially spaced circumferential grooves separated from each other and from said one end of the bore by a corresponding contiguous cylindrical land section, all of said land sections having the same diameter adapted to make a sliding fit with said tube and defining the radially inner surface of said bore, at least the groove nearest said one end of the bore having sidewalls which are inclined diverging radially inwardly with a substantial inclination, and at least one of the remaining grooves having sidewalls substantially perpendicular to the longitudinal axis of the fitting and joining the radially inner surface of said bore with sharp edges.

5. A fitting according to claim 1, wherein said body portion has a radially outer surface concentric with said bore and tapered throughout a zone at least substantially coextensive with said bore with the minimum diameter being over said one end of the bore.

6. A fitting according to claim 5, wherein said grooves are divided into two groups, a first group being adjacent said one end of the bore and consisting of a plurality of grooves all of which have inclined sidewalls diverging radially inwardly with a substantial inclination such that the series of grooves making up said first group provide the sidewall of the bore with a surface approaching a smooth ripple, and a second group being adjacent said first group and consisting of a plurality of grooves all of which have sidewalls substantially perpendicular to the longitudinal axis of the fitting and joining the radially inner surface of said bore with sharp edges.

7. A fitting according to claim 6, wherein all of the grooves in said first group are uniformly spaced axially from each other and from said one end of the bore, and said one end of the bore has its sidewall radiused to provide an axial continuation of said smooth ripple surface.

8. A fitting according to claim 4, wherein said inclined sidewalls are frusto-conical and have an inclination of the order of 9° to 23° with respect to the axis of said bore.

9. A tube joint comprising a hard metal body portion having a bore extending from an exterior surface, said bore having its sidewall formed with a plurality of axially spaced circumferential grooves separated from each other and from said exterior surface by a corresponding contiguous cylindrical land section, all of said land sections having the same diameter and defining the radially inner surface of said bore, at least the groove nearest said exterior surface having sidewalls which are inclined diverging radially inwardly with a substantial inclination, at least one groove other than said inclined sidewall groove having sidewalls substantially perpendicular to the longitudinal axis of the body portion and joining the radially inner surface of said bore with sharp edges, and a thin walled metal tube having an end within said bore deformed radially outwardly with metal extending into said grooves, at least said groove with the perpendicular sidewalls being substantially filled by the metal of said tube, the outer diameter of said tube outside of said body portion being such that it would normally fit said bore with a sliding fit.

10. A tube joint according to claim 9, wherein the metal of said body portion is selected from the group consisting of titanium and alloys of titanium.

11. A tube joint according to claim 9, wherein the metal of said tube is selected from the group consisting of titanium and alloys of titanium and the metal extends only partially into those grooves having inclined sidewalls.

12. A fitting for attachment to an end of a thin walled metal tube, said fitting comprising a hard metal body portion having a bore which can be entered with a sliding fit from one end by the end of a metal tube, said bore having its sidewall formed with a plurality of axially spaced circumferential grooves separated from each other and from said one end of the bore by a corresponding contiguous cylindrical land section, all of said land sections having the same diameter adapted to make a sliding fit with said tube and defining the radially inner surface of said bore, said grooves being divided into two groups, the first of said groups being located adjacent said one end of the bore and consisting of at least one groove, all of the grooves in said first group having sidewalls which are inclined diverging radially inwardly with a substantial inclination, the second of said groups being adjacent said first group and consisting of a plurality of grooves all of which have sidewalls substantially perpendicular to the longitudinal axis of the fitting and joining the radially inner surface of said bore with sharp edges.

13. A fitting according to claim 12, wherein all of the said grooves are uniformly spaced axially from each other and from said one end of the bore, and said one end of the bore has its sidewall radiused.

14. A tube joint comprising a hard metal body portion having a bore extending from an exterior surface, said bore having its sidewall formed with a plurality of axially spaced circumferential grooves separated from each other and from said exterior surface by a corresponding contiguous cylindrical land section, all of said land sections having the same diameter and defining the radially inner surface of said bore, said grooves being divided into two groups, the first of said groups being located adjacent said exterior surface and consisting of at least one groove, all of the grooves in said first group having sidewalls which are inclined diverging radially inwardly with a substantial inclination, the second of said groups being adjacent said first group and consisting of a plurality of grooves all of which have sidewalls substantially perpendicular to the longitudinal axis of the body portion and joining the radially inner surface of said bore with sharp edges, and a thin walled metal tube having an end within said bore deformed radially outwardly with metal extending into said grooves, at least said grooves with the perpendicular sidewalls being substantially filled by the metal of said tube, the outer diameter of said tube outside of said body portion being such that it would normally fit said bore with a sliding fit.

15. A tube joint according to claim 14, wherein the metal of said tube is selected from the group consisting of titanium and alloys of titanium and the metal extends only partially into those grooves having inclined sidewalls.

* * * * *